Dec. 29, 1936.   H. M. PRYALE ET AL   2,066,225
SADDLE SEAT
Filed Sept. 16, 1935
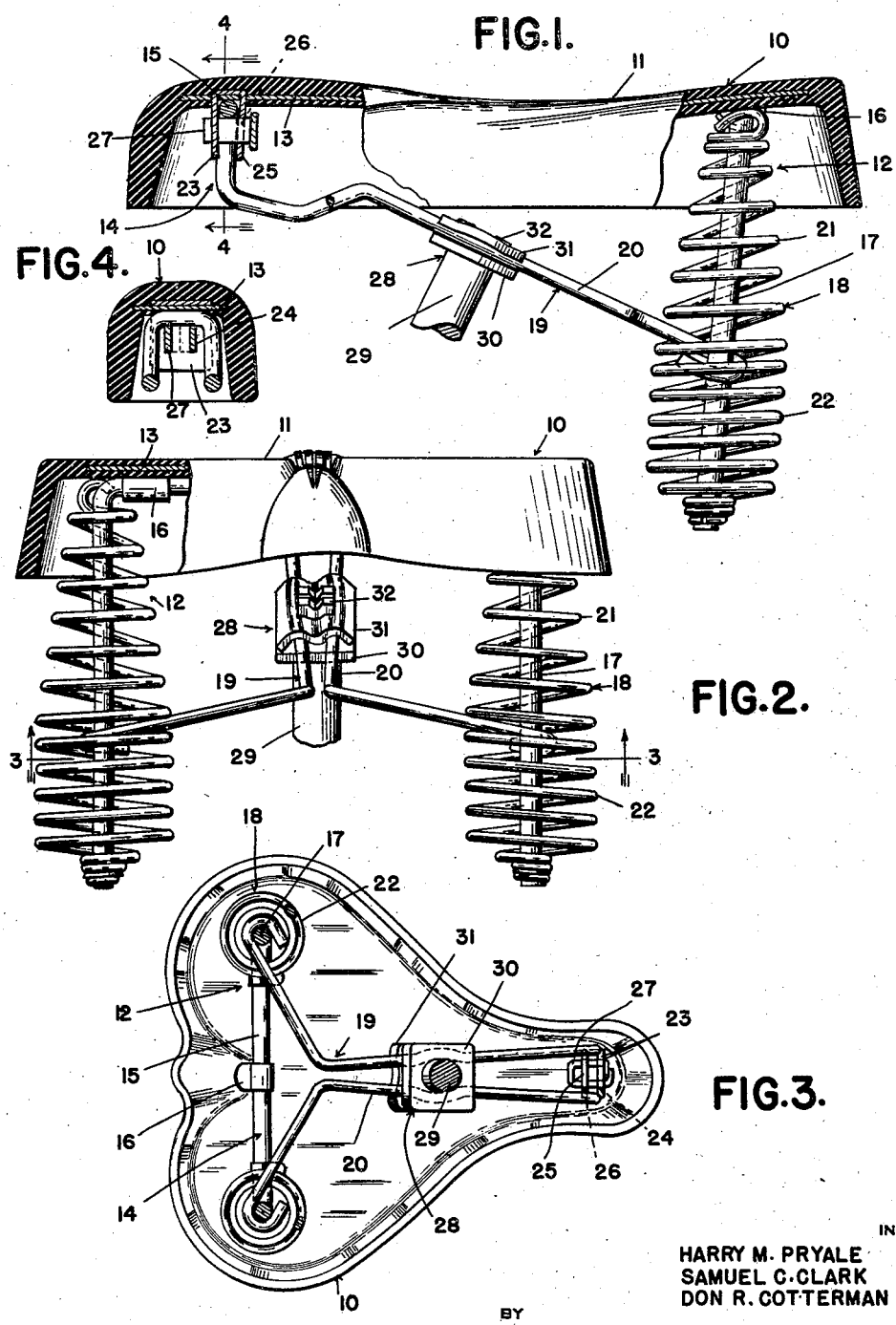
INVENTORS
HARRY M. PRYALE
SAMUEL C. CLARK
DON R. COTTERMAN
BY Whittemore Hulbert Whittemore
   & Belknap    ATTORNEYS Patented Dec. 29, 1936

2,066,225

UNITED STATES PATENT OFFICE 2,066,225

SADDLE SEAT

Harry M. Pryale, Samuel C. Clark, and Don R. Cotterman, Pontiac, Mich.

Application September 16, 1935, Serial No. 40,817

7 Claims. (Cl. 208—15)

This invention relates generally to saddle seats and refers more particularly to improvements in seats of the character employed on bicycles, tricycles, motorcycles and the like.

One of the principal features of this invention is to appreciably reduce the cost of manufacture of saddle seats of the above character by simplifying the construction of the several parts involved, and by providing relatively simple means for attaching the suspension unit to the saddle seat, rendering it possible to expediently assemble the suspension unit with the seat.

The above feature, as well as other objects, will be made more apparent as this description proceeds, especially when considered in connection with the accompanying drawing, wherein:

Figure 1 is a side elevational view, partly in section of a saddle constructed in accordance with this invention;

Figure 2 is a rear elevational view partly in section of the construction shown in Figure 1;

Figure 3 is a horizontal sectional view taken substantially on the plane indicated on the line 3—3 of Figure 2;

Figure 4 is a sectional view taken on the plane indicated on the line 4—4 of Figure 1.

Referring now, more in detail, to the drawing, it would be noted that there is illustrated in the several views, a saddle 10 having a seat 11 and having a spring suspension unit 12 supporting the seat. The seat 11 may be of any suitable construction but, for the purpose of illustrating the present invention, we have shown the seat as comprising a stamping 13 embedded in rubber, preferably molded to the desired contour.

The suspension system 12 for supporting the seat 11 comprises a yoke 14 of substantially inverted U shaped configuration, having the base portion 15 thereof secured to the underside of the seat 11 adjacent the rear end of the latter by means of lugs 16 struck out from the metallic plate 13 and bent around the base 15 of the yoke. As shown particularly in Figure 2, the depending arms 17 of the yoke are surrounded by suspension springs 18 having the lower ends secured to the corresponding ends of the arms 17 for rotation relative thereto.

Referring now to Figure 3 of the drawing, it will be noted that the arms 17 of the yoke 14 are connected to the forward end of the pommel of the saddle by means of a truss 19. In the present instance, the truss 19 is formed by bending a single strip of wire to a substantially Y-shaped configuration, and the truss is so assembled that the reach 20 or the stem portion of the Y-shaped truss is formed by double strands of the wire. The extremities of the double of the wire are, of course, bent laterally outwardly to provide the leg portions of the Y-shaped truss and the ends of the leg portions extend between adjacent convolutions of the springs 18 for sliding engagement with the arms 17 of the yoke. It will be observed from Figure 4, that the extremities of the portions of the Y-shaped truss divide the springs 18 into upper and lower sections 21 and 22, respectively. The upper sections 21 of the springs are preferably conical and the convolutions thereof are spaced from each other a greater distance than the convolutions of the lower sections 22. The convolutions of the coils of the lower sections 22 of the springs 18 are preferably of uniform diameter and act as tension members as distinguished from the sections which act as compression members. The arrangement is such that the two sections of the springs cooperate with one another to yieldably sustain the load on the seat and the lower sections of the springs serve to dampen the rebound movement, or the reaction of the springs. In this connection, attention may be called to the fact that the number of convolutions of the springs above and below the truss may be varied by merely rotating the springs relative to the arms 17 of the yoke.

The forward extremity of the reach 20 of the truss is bent upwardly and extends between a pair of lugs permanently secured in any suitable manner to the plate 13. As will be observed from Figure 3, the lugs extend transversely of the longitudinal center-line of the seat and are spaced from each other, in the direction of this center-line, a distance predetermined to provide for the passage of the upwardly directed forward end of the reach therebetween. The forwardmost lug is designated in Figure 3 by the reference character 23 and this lug is formed with two laterally spaced slots 24 therethrough. The rear lug is identified in the above figure by the reference character 25 and is provided with a single opening 23. With the above construction, it will be observed that fore-and-aft displacement of the truss is restricted by the lugs and in order to prevent vertical displacement of the forward extremity of the reach from a position between the lugs, a staple 27 is extended through the openings formed in the lugs. In detail, the staple is secured in assembled relation with the lugs by inserting the same from the rear side of the lug 25 in such a manner that the leg portions not only extend through the opening 26 in the lug 25, but also extend through the slots 24 in the lug 23. The extremities of the legs of the staple are then crimped over in the manner shown in Figure 3 to permanently secure the same to the lugs. In this connection, it is to be noted that the size of the opening 26 through the lug 25 is so determined with respect to the distance between the legs of the staple as to tension the legs upon inserting the same within the opening 26 and thereby prevent accidental displacement of the staple relative to the lug 25.

Prior to assembling the truss with the saddle seat proper, the unit 28 for attaching the saddle to the frame of the vehicle is secured to the reach 20 of the truss. The unit 28 comprises a post 29 having a rest 30 permanently secured thereto adjacent the upper end thereof in supporting engagement with the underside of the reach 20, and having a washer 31 on the upper extremity thereof co-operating with the rest to rigidly secure the post 29 to the reach. It will be understood, that the strands of the wire forming the reach 20 extend along opposite sides of the portion of the post above the rest 30 and the extreme upper end of the post is riveted as at 32 to permanently secure the washer 31 in clamping engagement with the reach.

Thus, from the foregoing, it will be observed that we have provided a saddle composed of a relatively few simple parts capable of being expediently and inexpensively manufactured. It will also be apparent, that we have provided a saddle construction wherein the suspension unit may be readily secured to the saddle seat proper by merely bending the several lugs 16 over the base portion 15 of the inverted U-shaped yoke 14 and by securing the staple 27 to the lugs at the forward end of the seat after the corresponding end of the reach has been inserted between the lugs. In addition, it will be noted that we have secured the foregoing simplicity in construction without sacrificing rigidity or efficiency in the operation of the suspension unit to both sustain the load on the seat and dampen the rebound action of the suspension springs.

What we claim as our invention is:

1. In a saddle, a seat having relatively fixed lugs depending from the forward end thereof and spaced from each other longitudinally of the seat, a support for the seat comprising a truss having a transverse portion at the forward end extending between the lugs, and means secured to the lugs below the transverse portion of the truss to secure the latter in position between the lugs, said means including a staple having leg portions insertable through openings in the lugs and having the free ends of the leg portions bent laterally over one of the lugs.

2. In a saddle, a seat having relatively fixed lugs spaced from each other longitudinally of the seat and depending from the forward end thereof, a support for the seat comprising a truss having laterally spaced longitudinally extending portions connected together at their forward ends by a transverse portion extending between the lugs, and a member readily attachable to the lugs and extending transversely of the lugs below the connecting portion aforesaid of the truss to secure the connecting portion in assembled relation with the lugs.

3. In a saddle, a seat, a member substantially channel shaped in cross section having the base portion fixedly secured to the forward end of the seat and having the flanges thereof extending transversely to the longitudinal center line of the seat, a support for the seat comprising a truss having a looped portion at the forward end received between the flanges of the channel shaped member, and means extending through the flanges of the channel shaped member below said loop to secure the forward end of the truss to the corresponding end of the seat.

4. In a saddle, a seat of molded material having a pommel, a member substantially channel shaped in cross section located within the pommel with the base portion thereof embedded in the molded material and with the flanges spaced from each other in a direction longitudinally of the pommel, a support for the seat comprising a truss having laterally spaced longitudinally extending portions connected together at their forward ends by a transverse portion extending between the flanges of the channel shaped member, and means securing the transverse portion of the truss in the channel of said member.

5. In a saddle, a seat having a reinforcing plate at the forward end thereof, a channel shaped member having the base portion secured to the reinforcing plate with the flanges of the channel extending downwardly from the plate in spaced relation from each other longitudinally of the seat, a support for the seat comprising a truss having a looped portion at the forward end and received between the flanges of the channel shaped member, and means extending through the flanges of the channel shaped member below the looped portion to secure the latter to said seat.

6. In a saddle, a seat having a reinforcing plate at the forward end thereof provided with openings therethrough at points spaced longitudinally of the seat, a member substantially channel shaped in cross section having the flanges thereof extending downwardly through the openings aforesaid in the reinforcing plate and having the base portion engaging the top surface of the reinforcing plate, a support for the seat comprising a truss having a looped portion at the forward end received between the flanges, and means for securing the looped portion in the channel of said member.

7. In a saddle, a seat, a member substantially channel shaped in cross section having the base portion secured to the forward end of the seat with the flanges extending downwardly in spaced relation to each other longitudinally of the seat, a support for the seat comprising a truss having a looped portion at the forward end received between the flanges, and a substantially U-shaped clip extending through aligned openings in the flanges below the looped portion of the truss and having the free ends crimped over one of the flanges of the channel shaped member.

HARRY M. PRYALE.
SAMUEL C. CLARK.
DON R. COTTERMAN.